United States Patent
Wang et al.

(10) Patent No.: US 12,547,382 B2
(45) Date of Patent: Feb. 10, 2026

(54) CODE PROCESSING METHOD AND APPARATUS, DEVICE, AND MEDIUM

(71) Applicant: Huawei Cloud Computing Technologies Co., Ltd., Guizhou (CN)

(72) Inventors: Yawei Wang, Shanghai (CN); Petrochenko Pavel, Novosibirsk (RU); Karpenko Dmitry, Novosibirsk (RU)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 282 days.

(21) Appl. No.: 18/310,749

(22) Filed: May 2, 2023

(65) Prior Publication Data

US 2023/0273776 A1 Aug. 31, 2023

Related U.S. Application Data

(63) Continuation of application No. PCT/CN2021/123127, filed on Oct. 11, 2021.

(30) Foreign Application Priority Data

Nov. 2, 2020 (RU) .............. RU2020135915

(51) Int. Cl.
  *G06F 8/36* (2018.01)
(52) U.S. Cl.
  CPC ...................... *G06F 8/36* (2013.01)
(58) Field of Classification Search
  None
  See application file for complete search history.

(56) References Cited

U.S. PATENT DOCUMENTS

| | | | |
|---|---|---|---|
| 9,043,759 B1* | 5/2015 | Lininger | G06F 11/3684 717/124 |
| 9,720,925 B1* | 8/2017 | Lawson | G06F 40/194 |
| 11,119,735 B1* | 9/2021 | Baafi | G06F 8/33 |
| 2010/0070852 A1* | 3/2010 | Li | G06F 16/958 715/239 |
| 2016/0314348 A1* | 10/2016 | Wang | G06V 30/40 |
| 2019/0332968 A1* | 10/2019 | Fu | G06N 20/00 |

(Continued)

FOREIGN PATENT DOCUMENTS

| CN | 108563433 A | 9/2018 |
|---|---|---|
| CN | 109901829 A | 6/2019 |

(Continued)

OTHER PUBLICATIONS

Asaduzzaman, "CSCC: Simple, Efficient, Context Sensitive Code Completion", 2014, IEEE (Year: 2014).*

(Continued)

*Primary Examiner* — Hossain M Morshed
(74) *Attorney, Agent, or Firm* — Conley Rose, P.C.

(57) ABSTRACT

Code inputted by a user is received through a user interface. A feature of context of to-be-completed code is determined based on the code inputted by the user. Next, at least one candidate item of the to-be-completed code is determined from a context database based on the feature of context of the to-be-completed code. The context database stores sample code and a feature of context of the sample code. Then, the at least one candidate item is presented to the user through the user interface.

18 Claims, 8 Drawing Sheets

(A)

(B)

(56) References Cited

U.S. PATENT DOCUMENTS

2020/0097261 A1* 3/2020 Smith ................... G06F 8/33
2020/0117446 A1* 4/2020 Smith ................... G06N 3/09
2020/0167138 A1* 5/2020 Schaude ............ G06F 16/951
2021/0303989 A1* 9/2021 Bird .................... G06N 3/08

FOREIGN PATENT DOCUMENTS

CN      110502227 A    11/2019
CN      110673836 A    1/2020

OTHER PUBLICATIONS

Mishne, "Typestate-Based Semantic Code Search over Partial Programs", 2012, ACM (Year: 2012).*

Muhammad Asaduzzaman, et al., "CSCC : Simple, Efficient, Context Sensitive Code Completion," IEEE International Conference on Software Maintenance and Evolution, Sep. 29, 2014, 10 pages.

* cited by examiner

```
...
public static void basicString(){
Document doc=
  ⊞ DocummetBuilderFactory.newInstance().newdDocumentBuilder().newDocument()   Document
  ⊞ DocummetBuilderFactory.newInstance().newdDocumentBuilder().parse()          Document
  ⊞ DOMUtils.getOwnerDocument(new IIOMetadataNode(""))                          Document
  ○ basicDOM                                                                    void
  ○ basicArray                                                                  void
```

```
public static void documentBuilderMethod(){
    String path="Path/to/file";
    Document doc=
        [+] DocumnetBuilderFactory.newInstance().newdDocumentBuilder().   Document
            parse(new File(path)
        [+] DocumnetBuilderFactory.newInstance().newdDocumentBuilder().   Document
            newDocument()
        O   path
        O   new
        O   null
}
```

(A)

```
public static void documentBuilderMethod(){
    String path="path/to/file";
    try{
        File file==New File (path) ;
        Document doc=DocumnetBuilderFactory.newInstance().newdDocumentBuilder().
        parse(new File(path)
    }
    }catch(ParserConfigurationException e){
        e.printStackTrace();
    }catch(SAXException e){
        e.printStackTrace();
    }catch(IOException e){
        e.printStackTrace();
    }
}
```

CODE PROCESSING METHOD AND APPARATUS, DEVICE, AND MEDIUM

CROSS-REFERENCE TO RELATED APPLICATIONS

This is a continuation of International Patent Application No. PCT/CN2021/123127 filed on Oct. 11, 2021, which claims priority to Russian Patent Application No. RU2020135915 filed on Nov. 2, 2020. The disclosures of the aforementioned applications are hereby incorporated by reference in their entireties.

TECHNICAL FIELD

This application relates to the field of software development technologies, and in particular, to a code processing method and apparatus, a device, and a computer-readable storage medium.

BACKGROUND

In a software development process, many development tools, such as an integrated development environment (IDE), provide a code completion function. Code completion means that a user inputs a part of code, for example, inputs a part of a keyword or function, and a development tool can provide at least one candidate item for the user, to help the user complete the keyword or function. In this way, input operations of the user can be reduced, thereby improving development efficiency.

With the progress of artificial intelligence (AI) technologies, especially deep learning, in text generation, automatic code generation and completion through AI has become a popular research direction. However, currently, when code completion is performed based on AI, accuracy of prediction of to-be-completed code is low. In many cases, users still need to manually complete code, or manually correct, after receiving a prediction result of to-be-completed code, the prediction result.

A code processing method with high accuracy of prediction needs to be urgently provided in the industry, to automatically complete code, so as to improve development efficiency.

SUMMARY

In view of this, this application provides a code processing method. In the method, a candidate item of to-be-completed code is predicted based on a feature of context of the to-be-completed code by performing static analysis on the code, thereby improving accuracy of prediction, implementing automatic code completion, and improving development efficiency. This application further provides an apparatus corresponding to the foregoing method, a device, a computer-readable storage medium, and a computer program product.

According to a first aspect, this application provides a code processing method. The method may be performed by a code processing system. The code processing system provides a user interface, such as a graphical user interface (GUI) or a command user interface (CUI).

The code processing system may receive, through the user interface, code inputted by a user, and then determine a feature of context of to-be-completed code based on the code inputted by the user. The feature of context refers to a feature that can express a context in which the code is located, for example, including any one or more of a type of a base class, a class name of a base class, a prefix, a return type, and a Boolean feature. Then, the code processing system determines at least one candidate item of the to-be-completed code from a context database based on the feature of context of the to-be-completed code. The context database stores sample code and a feature of context of the sample code. The sample code may include any one or more of tokens such as a class name, a method name, a function name, a variable name, or a parameter name in an open source dataset or a user private dataset. The code processing system may present the at least one candidate item to the user through the user interface such as a GUI, to implement code completion.

As the candidate item of the to-be-completed code is obtained by performing static analysis on the code, such as static syntax analysis and static semantic analysis, the candidate item of the to-be-completed code complies with a syntax rule. In addition, the candidate item of the to-be-completed code is determined from the context feature database based on the feature of context of the to-be-completed code, instead of being obtained through prediction by using a model such as long short-term memory (LSTM). Therefore, the candidate item has a high probability of passing a compilation check. Therefore, the candidate item predicted by this method has high accuracy. Code completion based on the candidate item can effectively reduce a quantity of times that the user manually completes code or effectively reduce a quantity of times that the user corrects completed code, thereby greatly improving development efficiency and improving user experience.

In addition, this method does not require a complex model, has a low requirement on computing power, does not require a graphics processing unit (GPU) resource, and can be performed locally, thereby avoiding a freezing phenomenon caused by a network transmission delay, and improving user experience.

In some possible implementations, the code processing system may further obtain statistical information of the at least one candidate item in the context database. The statistical information may include a quantity of times of calling the candidate item, such as a quantity of times of nested calls and a quantity of times of recursive calls. The statistical information may reflect a use frequency of the candidate item. The code processing system may filter the at least one candidate item based on the statistical information, for example, filter out a candidate item with a low use frequency. Correspondingly, the code processing system may present a candidate item obtained through filtering to the user through the user interface such as a GUI, so as to provide the user with a candidate item with a high use frequency. In this way, a quantity of candidate items can be effectively reduced, an outdated and deprecated application programming interface (API) is prevented from being recommended, and accuracy of prediction is improved.

The code processing system may further sort the candidate items based on the statistical information. Correspondingly, when providing the candidate items, the code processing system may further display the candidate items in order of a sorting result. In this way, the user can quickly learn of a candidate item that is sorted on the top and that has a high use frequency, so that the user can quickly select the candidate item, thereby improving code completion efficiency.

In some possible implementations, the code processing system may further input the at least one candidate item and the feature of context of the to-be-completed code into an assessment model, to obtain a recommendation probability of the at least one candidate item. Correspondingly, the code processing system may further screen the at least one candidate item based on the recommendation probability of the at least one candidate item, for example, determine a target candidate item in the at least one candidate item based on the recommendation probability of the at least one candidate item, and present the target candidate item to the user through the user interface. In this way, accuracy of prediction can be further improved, and code completion precision and efficiency can be improved.

The assessment model may be obtained by training an initial model by using samples collected from an open source dataset or a user private dataset. The initial model may be a simple model including two or more hidden layers. The hidden layer may be a fully connected layer (e.g., a dense layer). An activation function of the hidden layer may be a hyperbolic function such as a hyperbolic tangent function TANH. An output layer includes a loss function. The loss function may be a cross-entropy (XENT) loss function or the like.

The assessment model obtained by training the initial model does not need to consume a GPU resource, and may be deployed locally (for example, deployed in a local computing device). In this way, a transmission delay can be reduced, a freezing phenomenon caused by an excessively long network transmission delay can be avoided, and user experience can be improved.

In some possible implementations, the assessment model may be implemented by using a binary classification model. The binary classification model uses the candidate item and the feature of context of the candidate item as an input, and uses a recommendation tag as an output. The binary classification model specifically matches an inputted candidate item and a feature of context of the candidate item with an existing token and a feature of context of the token, to determine a recommendation tag. A value of the recommendation tag may be 0 or 1, or true or false. When the recommendation tag is 0 or false, it indicates that the candidate item is not recommended. When the recommendation tag is 1 or true, it indicates that the candidate item is recommended.

The assessment model may further filter the candidate items based on the recommendation tag, to improve accuracy of predicting the candidate item, thereby improving code completion precision. The assessment model may further obtain statistical information of a candidate item whose recommendation tag is 1 or true, and determine a recommendation probability of the candidate item based on the statistical information, for example, determine the recommendation probability based on a score value. In this way, the code processing system may display, in order of the recommendation probability, the candidate items recommended by the assessment model.

In some possible implementations, when the candidate item includes a function name, the code processing system may further fill the at least one candidate item with a parameter based on code (for ease of description, referred to as local code below) in a code file in which the code inputted by the user is located. Correspondingly, the code processing system may present, to the user through the user interface such as a GUI, the at least one candidate item filled with the parameter, so that multi-token completion can be implemented.

Specifically, the code processing system may search for a parameter corresponding to a function by using a depth-first search algorithm, for example, search the local code to obtain the parameter corresponding to the function, and then perform parameter filling on the candidate item based on the parameter obtained through searching. Further, the code processing system may further fill one candidate item with a plurality of groups of parameters, to obtain a candidate item filled with a plurality of parameters. The code processing system may sort, based on information including a distance between the parameter and the to-be-completed code, candidate items filled with a plurality of parameters, and filter the candidate items based on a sorting result or display the candidate items in order of the sorting result. In this way, a candidate item that is close to an intention of an input by the user can be displayed on the top, so that the user can quickly select the candidate item, thereby improving code completion efficiency.

It should be noted that in an object-oriented computer language, the function name includes a method name. Therefore, the code processing system can fill the candidate item with a method parameter based on the local code, thereby implementing multi-token completion.

In some possible implementations, the code processing system may perform code analysis based on the feature of context of the code, and determine the at least one candidate item of the to-be-completed code from the context database. Specifically, the code processing system may search the context database based on the feature of context of the to-be-completed code by using the depth-first search (DFS) algorithm, and determine the at least one candidate item of the to-be-completed code.

The code processing system may search, by using the depth-first search algorithm, for a candidate item that matches the feature of context of the to-be-completed code. For each candidate item, the code processing system may continue searching until a static function call is searched out.

In this method, the candidate item is searched out of the context feature library based on the feature of context of the to-be-completed code, and the sample code and the feature of context of the sample code in the context feature library are extracted from code that complies with a syntax rule and passes a compilation check. Therefore, the candidate item obtained by using this method complies with a syntax rule and has a high probability of passing a compilation check.

In addition, in this method, matching is performed by using the depth-first search algorithm, and all matching candidate items in the context feature library can be obtained. The sample code in the context database may further include an uncommon token, for example, an uncommon API. Based on this, even in a complex context environment (a context environment in which an uncommon API is used), by using this method, an accurate candidate item can still be determined from the context database, to implement high-precision code prediction.

In some possible implementations, the code inputted by the user includes a prefix of the to-be-completed code, for example, a prefix of a token to be completed. Based on this, the code processing system may further determine a completion condition based on the code inputted. The completion condition is specifically that the candidate item of the to-be-completed code includes the prefix. For a token whose length is N (N is a positive integer greater than 1), a prefix of the token may be any one of the first 1-bit code to the first N−1-bit code.

When the code inputted by the user includes the prefix of the to-be-completed code, the code processing system may determine, from the context database based on the feature of context of the to-be-completed code, at least one candidate item that matches the prefix of the to-be-completed code. In this way, the candidate item can be predicted more accurately, thereby improving accuracy of prediction.

In some possible implementations, the context database includes at least one of a database constructed based on an open source dataset and a database constructed based on a private dataset of the user.

Using a Java-based code completion scenario as an example, the code processing system may index code in an open source dataset such as GitHub corpus, to identify tokens in the code, such as a class name, a method name, a function name, a variable name, a parameter name, and an operator, then determine a feature of context of each of the tokens, and store the tokens and the features of context of the tokens in a database, so as to obtain a context database.

The code processing system may also index code in a user private dataset, for example, a code repository provided by the user, to identify tokens in the code, such as a class name, a method name, a function name, a variable name, a parameter name, and an operator, then determine a feature of context of each of the tokens, and obtain a context database based on the tokens and the features of context of the tokens.

Specifically, the code processing system may respectively construct context databases based on the open source dataset and the user private dataset, and determine the candidate item of the to-be-completed code by using the context database constructed based on the open source dataset and the context database constructed based on the user private dataset, so as to improve accuracy of prediction.

In some possible implementations, the to-be-completed code includes code in a method of a class (also referred to as a class method), and the code inputted by the user includes a return type. The code processing system may predict the candidate item of the to-be-completed code in the class method based on the return type, and implement completion of the class method based on the candidate item.

In some possible implementations, a class method may be called in different environments. Correspondingly, a context of a class method may be different. Based on this, the code processing system may determine, for each method call, a role of the method call based on a feature of context of the method call. For example, for the getitem( ) method, it can be determined that a role of the method call includes a get accessor (or referred to as read accessor); for the add( ) method, it can be determined that a role of the method call includes an adder; and for the removeitem( ) method, it can be determined that a role of the method call includes a remover.

When training the assessment model, the code processing system may further add a feature such as a role of a method call to improve precision of the assessment model. In this way, the assessment model can determine the recommendation probability of the candidate item based on the role of the method call, so that the candidate item recommended by the assessment model better satisfies the intention of the user, and therefore higher completion precision can be obtained.

In some possible implementations, considering that a relationship, for example, a producer-consumer relationship, exists between variables in code, a circular reference between the variables is invalid in most scenarios. For example, a variable A is a consumer of a variable B, and the variable B is also a consumer of the variable A, which is usually invalid. Therefore, the code processing system may further track a data flow, and filter a candidate item with a circular reference out of the at least one candidate item, and present a candidate item obtained through filtering to the user through the user interface such as a GUI. In this way, a circular reference can be avoided, and completion accuracy can be improved.

According to a second aspect, this application provides a code processing apparatus. The code processing apparatus includes: an interface unit, a feature extraction unit, and an analysis unit.

The interface unit is configured to receive, through a user interface, code inputted by a user.

The feature extraction unit is configured to determine a feature of context of to-be-completed code based on the code inputted by the user.

The analysis unit is configured to determine at least one candidate item of the to-be-completed code from a context database based on the feature of context of the to-be-completed code, where the context database stores sample code and a feature of context of the sample code.

The interface unit is further configured to present the at least one candidate item to the user through the user interface.

In some possible implementations, the analysis unit is further configured to: obtain statistical information of the at least one candidate item in the context database; and filter the at least one candidate item based on the statistical information.

The interface unit is specifically configured to: present a candidate item obtained through filtering to the user through the user interface.

In some possible implementations, the apparatus further includes: an assessment unit, configured to input the at least one candidate item and the feature of context of the to-be-completed code into an assessment model, to obtain a recommendation probability of the at least one candidate item; and determine a target candidate item in the at least one candidate item based on the recommendation probability of the at least one candidate item.

The interface unit is specifically configured to: present the target candidate item to the user through the user interface.

In some possible implementations, the apparatus further includes: a parameter filling unit, configured to fill, when the candidate item obtained through filtering includes a function name, the at least one candidate item with a parameter based on code in a file in which the code inputted by the user is located.

The interface unit is specifically configured to: present, to the user through the user interface, the at least one candidate item filled with the parameter.

In some possible implementations, the analysis unit is specifically configured to: search the context database based on the feature of context of the to-be-completed code by using a depth-first search algorithm, and determine the at least one candidate item of the to-be-completed code.

In some possible implementations, the code inputted by the user includes a prefix of the to-be-completed code.

The analysis unit is specifically configured to: determine, from the context database based on the feature of context of the to-be-completed code, at least one candidate item that matches the prefix of the to-be-completed code.

In some possible implementations, the context database includes at least one of a database constructed based on an open source dataset and a database constructed based on a private dataset of the user.

In some possible implementations, the to-be-completed code includes code in a class method, and the code inputted by the user includes a return type.

In some possible implementations, the apparatus further includes: an assessment unit, configured to determine, based on the feature of context of the to-be-completed code, a role called by the class method corresponding to the to-be-completed code, where the role is for assisting in determining the recommendation probability of the candidate item of the to-be-completed code.

In some possible implementations, the analysis unit is further configured to: filter a candidate item with a circular reference out of the at least one candidate item.

The interface unit is specifically configured to: present a candidate item obtained through filtering to the user through the user interface.

According to a third aspect, this application provides a device, including a processor and a memory. The processor and the memory communicate with each other. The processor is configured to execute instructions stored in the memory, so that the device performs the method in the first aspect or any one of the implementations of the first aspect.

According to a fourth aspect, this application provides a computer-readable storage medium. The computer-readable storage medium stores instructions. The instructions instruct a device to perform the method in the first aspect or any one of the implementations of the first aspect.

According to a fifth aspect, this application provides a computer program product including instructions. When the computer program product is run on a device, the device performs the method in the first aspect or any one of the implementations of the first aspect.

Based on the implementations provided in the foregoing aspects, this application may further provide more implementations through further combination.

BRIEF DESCRIPTION OF DRAWINGS

To describe the technical methods in embodiments of this application more clearly, the following briefly describes the accompanying drawings used in describing embodiments.

FIG. 2 is a schematic diagram of an interface displaying at least one candidate item according to an embodiment of this application;

FIG. 6 is a schematic diagram of an interface before and after code snippet completion according to an embodiment of this application;

DESCRIPTION OF EMBODIMENTS

Figure 1:
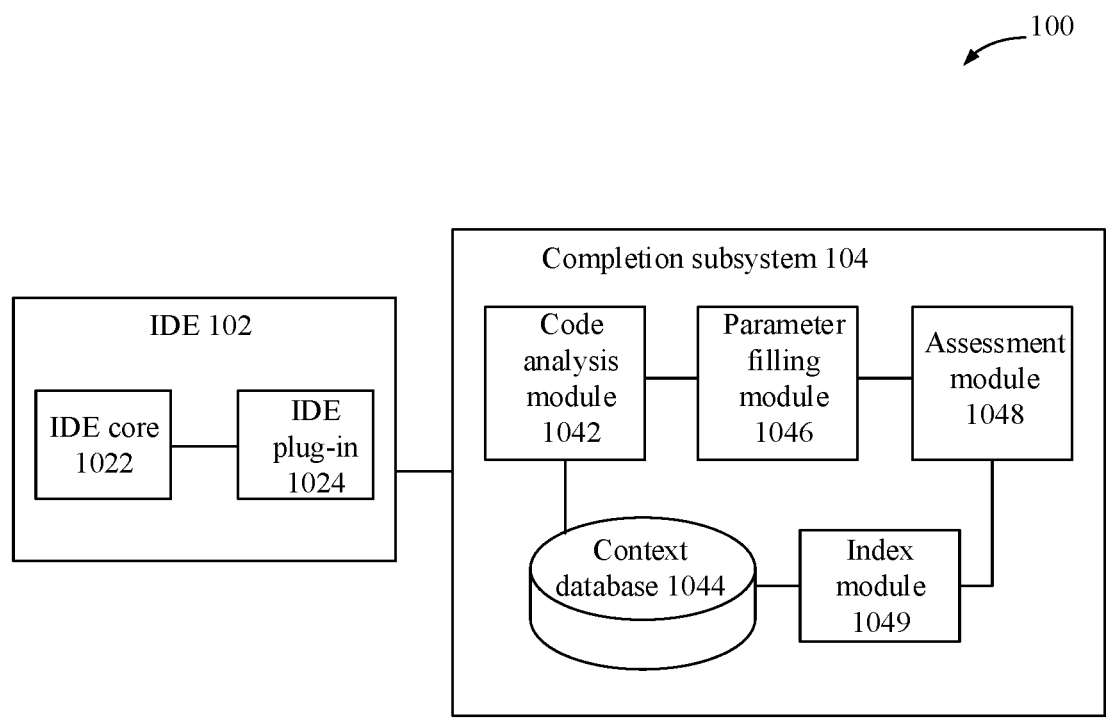
FIG. 1 is a diagram of a system architecture of a code processing system according to an embodiment of this application.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

Some technical terms used in embodiments of this application are first described.

In the field of software development, source code is a code file written by a developer using at least one of computer languages supported by a development tool such as a code editor or an IDE such as the C language, the Java language, and the Python language.

The source code (which may also be referred to as a source program) includes a series of human-readable computer language instructions. The computer language instructions in the source code may be compiled by a compiler into computer-executable binary instructions. A computer executes the binary instructions to implement corresponding functions. The computer-executable binary instructions may also be referred to as object code. Code may include source code and object code.

A token is the smallest compilation unit during source code compilation. The token may include any one or more of a keyword, a class name, a method name, a function name, a variable name, a parameter name, and an operator. The keyword is a word with a special meaning specified in a computer language, for example, break that represents a breakpoint, or return that represents a return. A class is a data structure that describes common attributes and methods of created objects in an object-oriented computer language. The class name is a name of a class. The method name is a name of a method described by a class. For example, the class name may be DocumentBuilder, and the method name may be newDocument.

A function is an executable code block used to implement a function. Because a method is related to an object and class and is called depending on the object, the method can also be considered as a special function in an object-oriented computer language. The function name is a name of a function, such as count and print. The function supports input of some parameters to process the parameters. Further, the function may further return some data, that is, the function may further include a return value. The parameter name is a name of a parameter. Parameters used to define a function name and a function body are referred to as formal parameters. A formal parameter is a virtual variable and does not occupy internal memory. Parameters when a function is called are referred to as actual parameters. An actual parameter is a variable that occupies internal memory. A variable is a data structure for storing variable data. The variable data may be a variable value, for example, a function value, or a variable text, for example, a text entered by a user. The variable name is a name of a variable.

Code completion is to predict, based on code (for example, source code) that has been inputted by a user (for example, a developer), at least one token that is intended to be inputted by the user, and to provide an input suggestion for the user based on a prediction result, so that the user directly completes the code based on the input suggestion. Code completion can reduce a quantity of times that a user enters characters, reduce spelling errors, and save time for the user to memorize unfamiliar class names, method names, and the like, thereby improving development efficiency.

Code completion can be classified into single-token completion and multi-token completion). The single-token completion is to predict a single token and then perform completion based on a prediction result. In some embodiments, the single-token completion may include completing a class name, a method name, a function name, a variable name, or a parameter name. The multi-token completion is to predict a plurality of tokens and then perform completion based on a prediction result. In some embodiments, the multi-token completion may include completing more of a class name, a method name, and a parameter name, or completing a code snippet including a plurality of tokens. The code snippet is a small segment of source code. The code snippet may include some functional statements, for example, a class declaration, a function declaration, or a code block having a start token and an end token. A typical application of multi-token completion is to complete a method of a class (also referred to as a class method for short), especially completing a class method with a return type.

With the breakthrough progress of AI, especially deep learning, in natural language text generation tasks, the industry has proposed a technical solution of processing a computer language text (e.g., code) through AI to implement automatic code completion. For example, a deep neural network based on a LSTM network is constructed. The network is a recursive neural network and is suitable for processing and predicting sequences in a chronological order. Then, the code inputted by the user is serialized to obtain an input sequence, and then the input sequence is inputted into the deep neural network to predict a candidate item of a next token, so as to implement single-token completion. Further, a candidate item with a high probability may be further selected. The candidate item and the inputted code are combined and then serialized to generate a new input sequence, and the input sequence is inputted into the deep neural network to predict a candidate item of a next token, so as to implement multi-token completion.

The key to the above method is code modeling. At present, code modeling mainly includes sequence modeling and abstract syntax tree (AST) modeling. Sequence modeling is implemented by performing lexical analysis on code to obtain token streams. However, by using this method, code that does not comply with syntax is likely to be generated. AST modeling is implemented by performing lexical analysis and syntax analysis on code. Code generated by using this method may fail to be compiled even if it complies with a syntax rule. That is, accuracy of code completion by using the foregoing method is not high, and it is difficult to satisfy needs of users.

In view of this, this application provides a code processing method. The method may be performed by a code processing system. Specifically, the code processing system receives, through a user interface such as a GUI or a CUI, code inputted by a user, determines a feature of context of to-be-completed code based on the code inputted by the user, and determines at least one candidate item of the to-be-completed code from a context database based on the feature of context of the to-be-completed code. The context database stores sample code and a feature of context of the sample code. The code processing system presents the at least one candidate item to the user through the user interface such as the GUI, to implement code completion.

As the candidate item of the to-be-completed code is obtained by performing static analysis on the code, such as static syntax analysis and static semantic analysis, the candidate item of the to-be-completed code complies with a syntax rule. In addition, the candidate item of the to-be-completed code is determined from the context feature database based on the feature of context of the to-be-completed code, instead of being obtained through prediction by using an LSTM model or the like. Therefore, the candidate item has a high probability of passing a compilation check. Therefore, the candidate item predicted by using this method has high accuracy. Code completion based on the candidate item can effectively reduce a quantity of times that the user manually completes code or effectively reduce a quantity of times that the user corrects completed code, thereby greatly improving development efficiency and improving user experience.

In addition, this method does not require a complex model, has a low requirement on computing power, does not require a GPU resource, and can be performed locally, thereby avoiding a freezing phenomenon caused by a network transmission delay, and improving user experience.

The sample code in the context database may include a rare API. Based on this, even in a complex context environment (a context environment in which an uncommon API is used), by using this method, an accurate candidate item can still be determined from the context database, to implement high-precision code prediction.

Further, the code processing system may further obtain statistical information of the at least one candidate item in the context database, and then filter the at least one candidate item based on the statistical information. In this case, accuracy of prediction can be further improved, and in addition, an outdated or deprecated candidate item, such as an outdated or deprecated API, can be prevented from being recommended.

The code processing system not only can predict tokens such as a method name and a function name, but also can predict parameters of a method and a function. That is, the code processing system can perform single-token prediction or multi-token prediction. Because the code processing system predicts a candidate item from a context database through static analysis, both single-token prediction and multi-token prediction have high accuracy. In addition, the code processing system inputs a candidate item filled with a parameter into an assessment model to obtain a recommendation probability of the candidate item, and then performs precise recommendation based on the recommendation probability, to further improve accuracy of code completion.

It should be noted that the code processing method provided in embodiments of this application may be provided for users in a form of a plug-in. A plug-in is a program that is compiled by using an application programming interface that complies with a specific rule. The program is run on a platform (or a plurality of platforms may be supported at the same time) specified by the program but cannot be run independently from the specified platform.

Specifically, a service provider or a third party of a development tool may release a plug-in for the development tool such as an IDE or a code editor, to enhance functions of the development tool. For ease of description, in this application, an example in which the development tool is an IDE is used for description.

FIG. 1 is a diagram of a system architecture of a code processing system. As shown in FIG. 1, the code processing system 100 includes an IDE 102 and a completion subsystem 104 located at a back end. The IDE 102 includes an IDE core 1022 and an IDE plug-in 1024 installed in the IDE 102. The completion subsystem 104 includes a code analysis module 1042 and a context database 1044. Optionally, the completion subsystem 104 may further include any one or more of a parameter filling module 1046, an assessment module 1048, and an index module 1049.

Specifically, the IDE core 1022 is configured to provide a native function of the IDE 102, such as code prompt and code spelling detection; and the IDE plug-in 1024 is configured to interact with the completion subsystem 104 to implement an enhancement function, for example, implement intelligent code completion. The interaction process is described in detail below.

In some embodiments, the IDE plug-in 1024 may receive, through a user interface, code inputted by a user, and obtain a location of an input cursor in the code. The location of the input cursor is a location of to-be-completed code. Therefore, a feature of context of the to-be-completed code can be determined, for example, any one or more of a type (such as public, private, or protected) of a base class, a class name of a base class, a prefix, a return type, or a Boolean feature. The Boolean feature may include at least one of the following features:

private boolean is_in_direct_new;
    private boolean is_in_binary_op;
    private boolean is_in_variable_name;
    private boolean inClassDeclarationName;
    private boolean is_in_interface; and
    private boolean is_in_for_declaration.

The IDE plug-in 1024 may send the feature of context of the to-be-completed code to the completion subsystem 104. The completion subsystem 104 performs static analysis based on the feature of context of the to-be-completed code, generates at least one candidate item of the to-be-completed code, and returns the at least one candidate item to the IDE plug-in 1024. The IDE 102 may present the at least one candidate item of the to-be-completed code to the user, so that the user can select one candidate item from the at least one candidate item to complete the code.

The context database 1044 of the completion subsystem 104 stores sample code and a feature of context of the sample code. The sample code may be a token such as a class name, a method name, a function name, a variable name, or a parameter name. It should be noted that the sample code may be a single token, or may be a plurality of tokens. The feature of context of the sample code is specifically a feature extracted based on the context of the sample code, for example, may be a variable type, an object type, or a return type. The code analysis module 1042 of the completion subsystem 104 may determine the at least one candidate item of the to-be-completed code from the context database 1044 based on the feature of context of the to-be-completed code.

For ease of understanding, an embodiment of this application further provides a schematic diagram of an interface presenting a candidate item to a user by the IDE 102. As shown in FIG. 2, a code editing interface 200 presents code inputted by the user. Details are specifically shown in 202 in the figure. It should be noted that 202 in FIG. 2 shows a snippet of the code inputted by the user, which is specifically as follows:

public static void basicString( ){
      Document doc=

Some code snippets may be further included before or after the snippet of the code, which are shown as " . . . " in FIG. 2 for illustration. When the IDE plug-in 1024 obtains a location of an input cursor, which is specifically after "=", the IDE plug-in 1024 may determine a context of to-be-completed code based on the location, and further extract a feature of context of the to-be-completed code. In this example, the feature of context of the to-be-completed code may include that a return type is a Document type. The IDE plug-in 1024 sends the feature of context to the completion subsystem 104. The code analysis module 1042 determines at least one candidate item of the to-be-completed code from the context database based on the feature of context. Optionally, the code analysis module 1042 may further obtain statistical information of the at least one candidate item in the context database 1044, and filter the at least one candidate item based on the statistical information. Further, the code analysis module 1042 may further transmit a candidate item (for example, a candidate item obtained through filtering) to the parameter filling module 1046 and the assessment module 1048 for subsequent processing, for example, performing parameter filling and recommendation probability assessment. The IDE 102 may obtain the candidate item, for example, the candidate item obtained through filtering by the code analysis module 1042, the candidate item filled with a parameter by the parameter filling module 1046, or the candidate item determined by the assessment module 1048 based on a recommendation probability, and display the candidate item. Details are specifically shown in 204 in FIG. 2.

It should be noted that the IDE core 1022 may also directly generate, by using a text completion technology, at least one candidate item based on the code inputted by the user. In some embodiments, a completion method, for example, a text completion method, provided by the IDE core 1022 may be compatible with the code completion method provided in embodiments of this application. When the text completion method provided by the IDE core 1022 is used together with the code processing method provided in embodiments of this application, the IDE 102 may display both a candidate item generated by using the text completion method and a candidate item generated by using the code processing method provided in embodiments of this application. Details are shown in 204 and 206 in FIG. 2.

When displaying the candidate items generated by using different methods, the IDE 102 may further distinguish the candidate items in different display manners. For example, the IDE 102 may add, in front of the candidate item, an identifier of a method used when the candidate item is generated. As shown in FIG. 2, the IDE 102 may identify, using a circle, the candidate item generated by the IDE core 1022 using the text completion method, and identify, using a block with a plus sign inside, the candidate item generated by using the code processing method in embodiments of this application. In another example, the IDE 102 may distinguish, through different colors or different fonts, the candidate items generated by using different methods.

It should be noted that the IDE 102 may display the candidate items in order based on a probability of each candidate item. In this way, the user can quickly learn of a candidate item with a high probability, and select the candidate item with a high probability to perform code completion.

In some possible implementations, the code analysis module 1042 may determine more candidate items from a code feature library based on the feature of context of the to-be-completed code. Considering that some candidate items have a low probability of being used, the code analysis module 1042 may further filter the at least one candidate item based on the statistical information of the at least one candidate item in the context database 1044, such as a quantity of times of being called callCount and a quantity of times of nested calls nestedCount, to filter out a candidate item with a low probability.

Further, when the candidate item is a function name (where in an object-oriented computer language, the function name may be a method name), the parameter filling module 1046 may further perform parameter filling on the candidate item, for example, the candidate item obtained through filtering, so as to implement multi-token completion, and avoid the user from manually inputting a parameter of a function. Specifically, the parameter filling module 1046 may determine a proper parameter by searching local code (e.g., code in a code file in which the code inputted by the user is located), and fill the candidate item with the parameter. Then, the parameter filling module 1046 inputs the candidate item filled with the parameter into the assessment module 1048. The assessment module 1048 may assess, by using an assessment model, the candidate item filled with the parameter, and determine a recommendation probability of the candidate item filled with the parameter.

The assessment module 1048 may send, to the IDE plug-in 1024, candidate items filled with parameters and the recommendation probabilities of the candidate items. Correspondingly, based on the recommendation probabilities, the IDE 102 may display top N candidate items or display candidate items whose recommendation probabilities are greater than a preset probability. It should be noted that the assessment module 1048 may also screen, based on the recommendation probability, the candidate items filled with the parameters, for example, screen out top N candidate items or screen out candidate items whose recommendation probabilities are greater than a preset probability, and then return, to the IDE plug-in 1024, the candidate items that are screened out. The IDE displays the candidate items that are screened out, or displays the candidate items that are screened out and the recommendation probabilities of the candidate items.

The index module 1049 may further index local code, for example, code in a code repository of the user, obtain sample code and a feature of context of the sample code based on an indexing result, and store the sample code and the feature of context of the sample code in the context database 1044. Correspondingly, the candidate items determined by the code analysis module 1042 from the context database 1044 based on the feature of context of the to-be-completed code may include local code calls, for example, include local variable names. The index module 1049 indexes the code in the code repository of the user, enriching the context database, so that an intelligent recommendation result is more accurate in intelligent code completion.

In some possible implementations, when developing the foregoing development tool, a service provider of the development tool may also natively embed code related to the code processing method provided in embodiments of this application into the core. In this way, a plug-in installation operation can be omitted, avoiding a security risk introduced by plug-in installation.

In embodiments of this application, all parts of the code processing system 100 may be centrally deployed in a local computing device (user equipment that is directly controlled by the user, including a user terminal such as a notebook computer, a desktop computer, or a smartphone) or a cloud computing cluster (including at least one cloud computing device, such as a cloud server). Certainly, all parts of the code processing system 100 may alternatively be deployed in a cloud computing cluster in a distributed manner. The following describes a deployment manner of the code processing system 100 in detail.

In some possible implementations, the IDE 102 and the completion subsystem 104 may be deployed in a local computing device, for example, a terminal device such as a personal computer (PC). The code processing system 100 in embodiments of this application consumes small computing power during code analysis, and the assessment model can be implemented by using a simple network (for example, including two hidden layers). Therefore, a requirement on computing performance of the terminal device is low, and a lightweight terminal device can satisfy a service requirement. In addition, both the completion subsystem 104 and the IDE 102 are deployed in the local computing device, so that time for interacting between the IDE 102 and the completion subsystem 104 can be reduced, avoiding a frozen completion function caused by a network transmission delay to affect user experience.

In some other possible implementations, the IDE 102 and the completion subsystem 104 may be deployed in a cloud computing cluster. That is, the IDE 102 is a cloud IDE, and the IDE 102 and the completion subsystem 104 are provided for the user in a form of a cloud service.

A cloud service provider may integrate an intelligent code completion service provided by the completion subsystem 104 and a service provided by a code development environment provided by the cloud IDE into one cloud service for use by the user, or may separately provide two cloud services of the cloud IDE and the intelligent code completion for use by the user. In some cases, a cloud service provider may use an intelligent code completion service as a value-added service of the cloud IDE. After a user purchases or leases the value-added service, the cloud service provider provides the value-added service in the cloud IDE for the user.

Figure 3A:
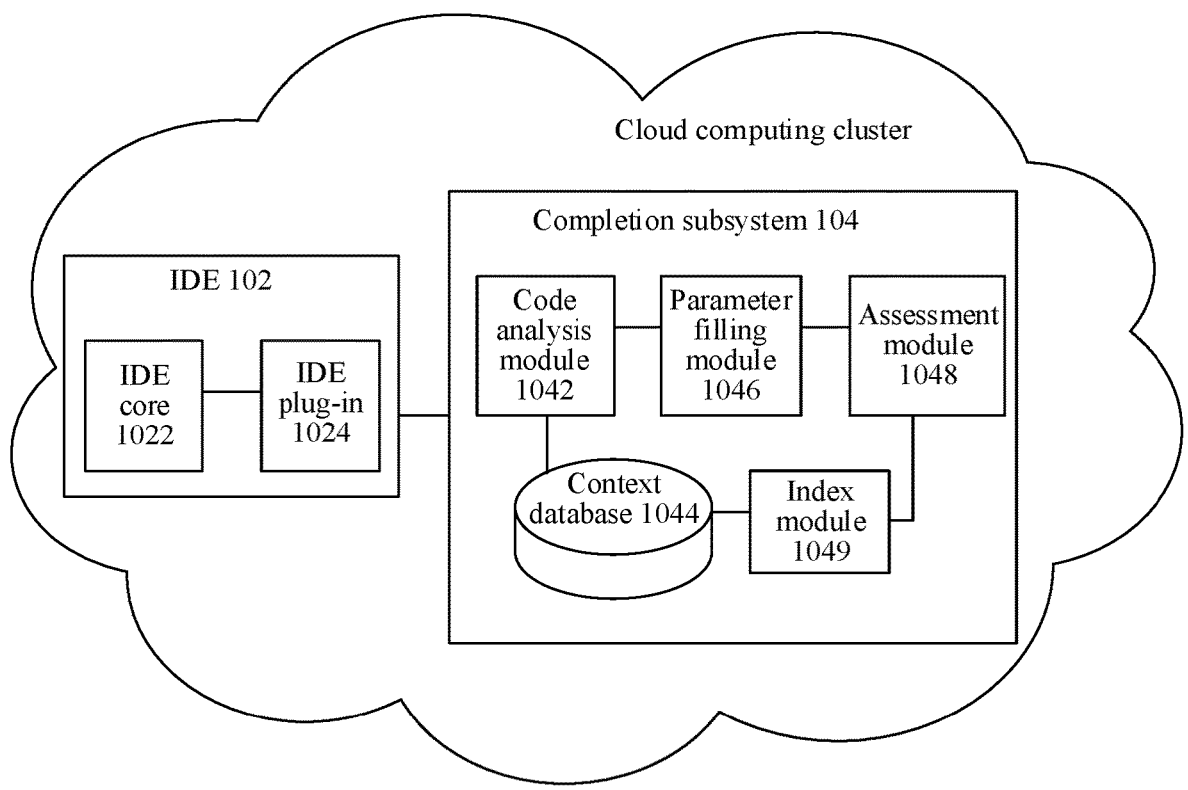
FIG. 3A is a schematic diagram of an architecture of a code processing system according to an embodiment of this application.

FIG. 3A is a schematic diagram of an architecture of a code processing system 100. As shown in FIG. 3A, an IDE 102 and a completion subsystem 104 are provided by a cloud service provider, and the IDE 102 and the completion subsystem 104 may be deployed in a same cloud computing cluster. In another possible implementation of this embodiment of this application, the IDE 102 and the completion subsystem 104 may be provided by different cloud service providers and deployed in different cloud computing clusters.

Figure 3B:
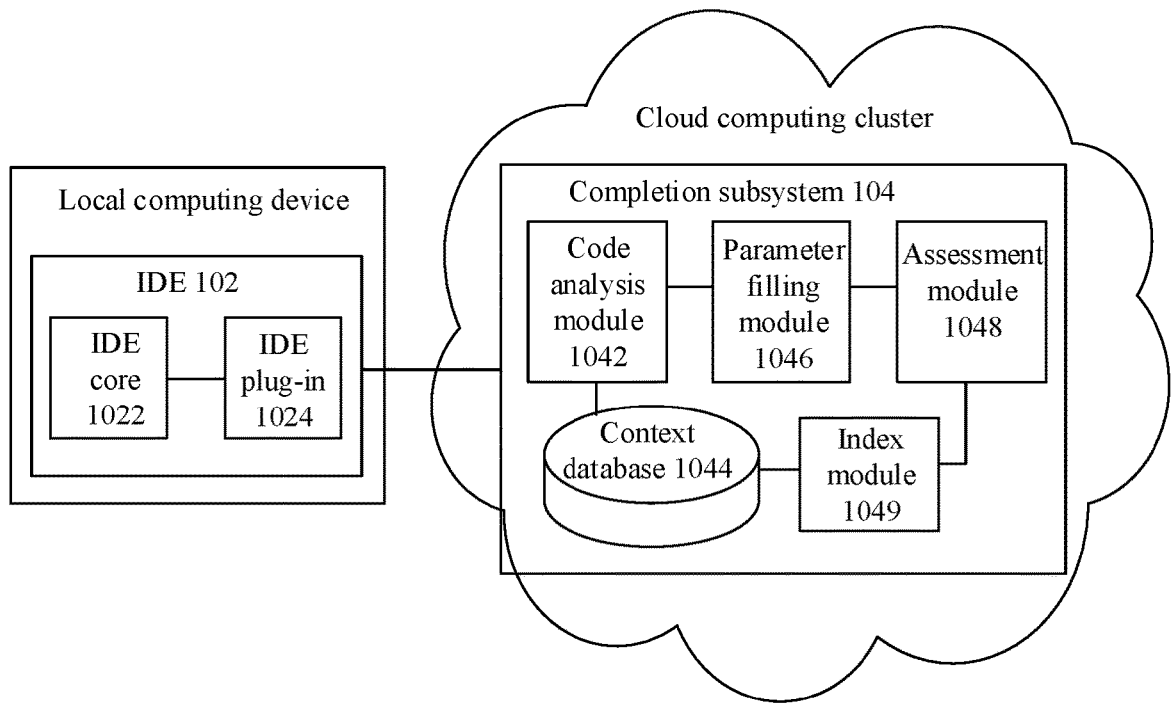
FIG. 3B is a schematic diagram of an architecture of a code processing system according to an embodiment of this application.

Next, FIG. 3B is a schematic diagram of an architecture of a code processing system 100. An IDE 102 may be deployed in a local computing device, and a completion subsystem 104 may be deployed in a cloud computing cluster. When a user performs code processing by using the IDE 102 deployed in the local computing device, if code completion is triggered, the IDE 102 calls the completion subsystem 104 in the cloud computing cluster to obtain at least one candidate item of to-be-completed code. A user who uses this completion service may pre-register a cloud service, so that traffic increase of the cloud service can be implemented.

In addition, an assessment model deployed in the cloud computing cluster may be based on a private dataset of the user, for example, a customized model obtained through training based on a dataset constructed from a code repository provided by the user. The model is more suitable for a user environment, and has a good recommendation effect.

FIG. 3A and FIG. 3B are merely some specific examples of deployment manners of the code processing system 100 in embodiments of this application. In another possible implementation of embodiments of this application, the code processing system 100 may be deployed in another manner. For example, the IDE 102 is deployed in a cloud, and the completion subsystem 104 is deployed in a local computing device. This is not limited in embodiments of this application.

Next, the code processing method provided in embodiments of this application is described in detail from a perspective of the code processing system 100.

Figure 4:
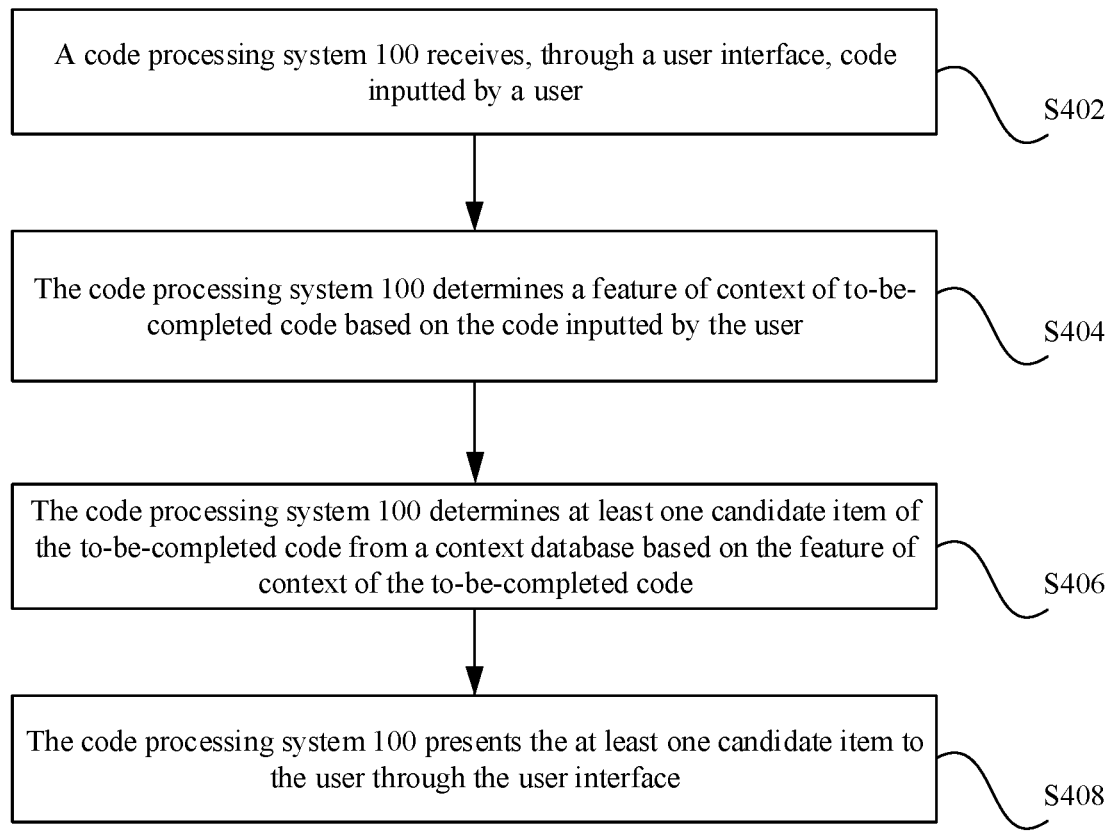
FIG. 4 is a flowchart of a code processing method according to an embodiment of this application.

FIG. 4 is a flowchart of a code processing method. The method includes the following steps.

S402. A code processing system 100 receives, through a user interface, code inputted by a user.

The code processing system 100 (for example, an IDE 102) may receive, through the user interface (for example, a GUI or CUI), the code entered by the user by using a physical keyboard. Certainly, the code processing system 100 may alternatively receive, through the user interface, the code entered by the user by using a virtual keyboard in a touch manner.

In some possible implementations, the code processing system 100 may alternatively receive code in a code file by selecting the code file through the user interface. The code in the code file may include code previously written by the current user, or may include code previously written by another user.

The code inputted by the user may be code written in a single computer language, for example, code written in the C language, code written in the Java language, or code written in the Python language. In some embodiments, the code inputted by the user may alternatively be code written in a plurality of computer languages in a hybrid programming manner, for example, code written in the C language or an embedded assembly language.

S404. The code processing system 100 determines a feature of context of to-be-completed code based on the code inputted by the user.

The code processing system 100 (for example, an IDE plug-in 1024 in the IDE 102) may capture a location of an input cursor. When a code completion function is triggered, the location of the input cursor is a completion location. It should be noted that the completion location may be an end location or a middle location of an input line. Certainly, in some embodiments, the completion location may alternatively be a start location of the input line.

In a computer language, a context of code can be understood as a language environment in which the code is located. Features of context are features that can express a context in which the code is located, for example, including any one or more of a type of a base class, a class name of a base class, a prefix, a return type, and a Boolean feature.

For example, inputted code includes "Document doc=", a completion location of to-be-completed code is a location after "=", the location is specifically an end location of the input, and a feature of context of the to-be-completed code may include that a return value type is a Document type and a Boolean type is_in_API is true. That is_in_API is true indicates that the current completion is class method completion.

A completion type may be single-token completion or multi-token completion. The code processing system may determine, based on a preset setting, that the completion type is single-token completion or multi-token completion, or may determine, based on a completion type that is set when the user triggers the code completion function, that the current completion is single-token completion or multi-token completion.

There may be a plurality of implementations for triggering the completion function. For example, the code processing system 100 may detect that time when the user stops inputting reaches preset time, and determine to trigger the code completion function. In another example, the code processing system 100 may set a trigger condition, such as double-clicking on a right mouse button, or single-pressing on a keyboard shortcut (for example, a tab key). When the code processing system 100 detects that the trigger condition is satisfied, for example, detects that the user double-clicks the right mouse button or single-presses the keyboard shortcut, the code completion function is triggered. Further, the user may set the completion type as single-token completion or multi-token completion when triggering the code completion function.

In some possible implementations, the inputted code may include a prefix of the to-be-completed code, for example, a prefix of a token to be completed. Based on this, the code processing system 100 may further determine a completion condition based on the inputted code. The completion condition is specifically that the candidate item of the to-be-completed code includes the prefix. For a token whose length is N (where N is a positive integer greater than 1), a prefix of the token may be any one of the first 1-bit code to the first N−1-bit code.

S406. The code processing system 100 determines at least one candidate item of the to-be-completed code from a context database based on the feature of context of the to-be-completed code.

The context database stores sample code and a feature of context of the sample code. The sample code may include any one or more of tokens such as a class name, a method name, a function name, a variable name, or a parameter name. The sample code may come from an open source dataset or a user private dataset.

Specifically, using a Java-based code completion scenario as an example, the code processing system 100 may index code in an open source dataset such as GitHub corpus, to identify tokens in the code, such as a class name, a method name, a function name, a variable name, a parameter name, and an operator, then determine a feature of context of each of the tokens, and store the tokens and the features of context of the tokens in a database, so as to obtain a context database.

In some possible implementations, the code processing system 100 may also index code in a user private dataset, for example, a code repository provided by the user, to identify tokens in the code, such as a class name, a method name, a function name, a variable name, a parameter name, and an operator, then determine a feature of context of each of the tokens, and obtain a context database based on the tokens and the features of context of the tokens.

In consideration of accuracy, the code processing system 100 may also respectively construct context databases based on the open source dataset and the user private dataset, for example, construct a first context database and a second context database. The first context database is used to store tokens in the open source dataset and features of context of the tokens. The second context database is used to store tokens in the user private dataset and features of context of the tokens.

After the context database is constructed, the code processing system 100 (for example, a code analysis module 1042 in the completion subsystem 104) may perform code analysis based on the feature of context of the code, and determine the at least one candidate item of the to-be-completed code from the context database.

Specifically, the code processing system 100 (for example, the code analysis module 1042 in the completion subsystem 104) searches the context database based on the feature of context of the to-be-completed code by using a DFS algorithm, and determines the at least one candidate item of the to-be-completed code.

The depth-first search algorithm is an algorithm for traversing a tree (for example, an abstract syntax tree of code) or graph. Tree traversal is used as an example for description. Nodes of a tree are visited along a depth of the tree, to search branches of the tree as deep as possible. When edges on which a node v is located have been searched, the search backtracks to a start node of an edge on which the node v is found. This process continues until all nodes that are reachable from a source node are found. If there are still nodes that have not been found, one of the nodes is selected as a source node, and the foregoing process is repeated. The entire process is repeated until all nodes are visited.

The code processing system 100 may search, by using the depth-first search algorithm, for a candidate item that matches the feature of context of the to-be-completed code, and for each candidate item, the code processing system 100 may continue searching until a static function call is searched out.

Using "Document doc=" as an example, a return value type is a Document type, and the code processing system 100 may search for a function call or an API call whose return value type is the Document type, for example, including newDocument( ) or parse( ). For newDocument, the code processing system 100 continues deep searching, determines that newDocument is called by DocumentBuilder, and then searches for a call that returns DocumentBuilder, for example, including newDocument Builder( ). Then, the code processing system 100 continues deep searching based on newDocument Builder( ). Specifically, the code processing system 100 determines that DocumentBuilder is called by DocumentBuilderFactory, and the code processing system 100 searches for a call that returns DocumentBuilderFactory.newInstance.

Because DocumentBuilderFactory.newInstance is a static function call, and the static function call can be directly called on the right of the equal sign, the code processing system 100 may stop deep searching for newDocument and generate the candidate item: DocumentBuilderFactory.newInstance( ).newdDocumentBuilder( ).newDocument( ).

For a deep searching process for parse( ) refer to the deep searching process for newDocument( ) The following candidate item can be generated based on the searching process: DocumentBuilderFactory.newInstance( ).newdDocumentBuilder( ).parse( ).

Further, when the code inputted by the user includes the prefix of the to-be-completed code, the code processing system 100 (for example, the code analysis module 1042) may determine, from the candidate items obtained through searching, at least one candidate item that matches the prefix of the to-be-completed code. Using "Document doc=Doc" as an example, a prefix includes Doc. In this case, the code processing system 100 may select, from the obtained candidate items whose return values are the Document type, a candidate item whose prefix includes Doc, and filter out a candidate item whose prefix does not include Doc, for example, DOMUtils.getOwnerDocument(new IIOMetadataNode(" ")).

In some possible implementations, the code processing system 100 may further determine an evaluation indicator value of the at least one candidate item, and then filter the at least one candidate item based on the evaluation indicator value or perform sorting based on the evaluation indicator value.

The evaluation indicator value may be a score value determined based on statistical information of the candidate item in the context database 1044, or may be a probability value of a recommendation probability determined based on an assessment model. The statistical information may include usage information. For example, when the candidate item includes a class name (typename), the statistical information may include class usage information. In another example, when the candidate item includes a method name, the statistical information may include method usage information.

The class usage information may specifically include any one or more of the following information:
    public int nestedCount;
    public int extendsCount;
    public int fieldCount;
    public int assignCount;
    public int ifCount;
    public int finallyCount;
    public int localVariableCount;
    public int parameterCount;
    public int newCount;
    public int callBaseCount;
    public int totalCount;
    public int localCount; and
    public int samePackage.

Similarly, the method usage information may specifically include any one or more of the following information:
    public int callCount;
    public int constructorCount;
    public int methodCount;
    public int repeatCount;
    public int firstCount;
    public int boolCount;
    public int finallyCount;
    public int nestedCount;
    public int rightAssignSide; and
    public int inReturn.

The code processing system 100 (for example, the code analysis module 1042 in the completion subsystem 104) may determine a score value of the candidate item based on the foregoing usage information of the candidate item. Specifically, the code processing system 100 may separately assign weights to different usage information, and then determine the score value of the candidate item by performing a weighting operation (for example, weighted summation or weighted mean).

The code processing system 100 may filter the at least one candidate item based on the score value. For example, the code processing system 100 may filter out a candidate item whose score value is less than a preset value or a candidate item whose score value is lower (for example, below Top 10). In this way, an outdated or deprecated API or the like can be prevented from being recommended, and accuracy is improved. Further, the code processing system 100 may sort the at least one candidate item based on the score value, so as to display the at least one candidate item in order of the score value.

In some possible implementations, when the candidate item includes a function name, the code processing system 100 may further fill the at least one candidate item with a parameter. Specifically, the code processing system 100 may search for a parameter corresponding to a function by using a depth-first search algorithm, for example, search the local code to obtain the parameter corresponding to the function, and then perform parameter filling on the candidate item based on the parameter obtained through searching.

Figure 5:
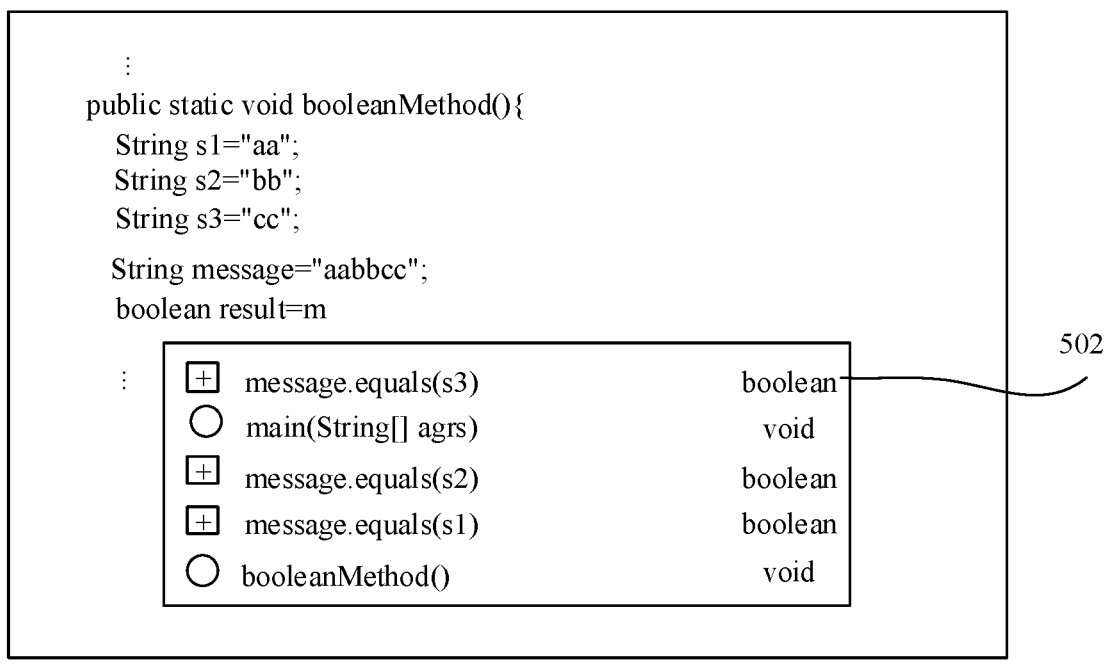
FIG. 5 is a schematic diagram of an interface displaying at least one candidate item according to an embodiment of this application.

During parameter filling, the code processing system 100 (for example, a parameter filling module 1046 of the completion subsystem 104) may fill one candidate item with a plurality of groups of parameters, to obtain a candidate item filled with a plurality of parameters. As shown in FIG. 5, the code processing system 100 may sort, based on information including a distance between the parameter and the to-be-completed code, candidate items filled with a plurality of parameters. For example, the code processing system 100 may display a candidate item 502 filled with a parameter that is closer to the to-be-completed code on the top.

In some possible implementations, when the candidate item includes a function name, the code processing system 100 may further provide a candidate item filled with a parameter and a candidate item not filled with a parameter for the user, so that when the candidate item filled with a parameter does not satisfy a requirement of the user, the user can select the candidate item not filled with a parameter, and manually input a parameter, to avoid an unnecessary correction operation.

After parameter filling, the code processing system 100 may not only be configured to complete an entire line of code, but may also be configured to further complete an entire code snippet. Code snippet completion is essentially multi-token completion. For a specific implementation, refer to a specific implementation of completing an entire line of code.

FIG. 6 further shows an interface of completing an entire code snippet. FIG. 6(A) is a schematic diagram of an interface before a code snippet is completed. As shown in FIG. 6(A), code inputted by a user includes:

```
public static void documentBuilderMethod( ) {
    String path="/path/to/file";
    Document doc=
```

Based on the foregoing code, the code processing system 100 may identify local variables path and file, and determine at least one candidate item based on the document type, including:
DocumentBuilderFactory.newInstance(  ).newdDocumentBuilder( ).parse( )

Then, the code processing system 100 identifies file as a parameter of the candidate item, and needs to create file before the identification, where path is used as a parameter of file. In addition, the code processing system 100 identifies the parser configuration exception ParserConfigurationException, and completes the try catch statement in the code snippet based on the exception. As shown in FIG. 6(B), the bold and italic code is the completed code.

In some possible implementations, the code processing system 100 may further input the at least one candidate item (for example, the candidate item filled with a parameter) and the feature of context of the to-be-completed code into the assessment model, to obtain a recommendation probability of the at least one candidate item. Correspondingly, the code processing system 100 may determine a target candidate item in the at least one candidate item based on the recommendation probability of the at least one candidate item. The target candidate item is a candidate item whose recommendation probability satisfies a preset condition, for example, a candidate item whose recommendation probability is greater than a preset probability value or whose recommendation probability is sorted on the top (for example, top N, where N is a positive integer).

The assessment model may be obtained by training an initial model by using samples collected from an open source dataset or a user private dataset. Specifically, the code processing system 100 may construct an initial model. The initial model may be a model including two or more hidden layers. In some embodiments, the initial model may include one input layer, two hidden layers, and one output layer. The hidden layer may be a fully connected layer (e.g., a dense layer). An activation function of the hidden layer may be a hyperbolic function such as a hyperbolic tangent function TANH. An output layer includes a loss function. The loss function may be a XENT loss function or the like.

Then, the code processing system 100 may input samples (including tokens and features of context of the tokens) collected from an open source dataset or a user private dataset into the initial model for training to iteratively update parameters of the initial model. When a loss function of the model satisfies a training end condition, for example, the loss function tends to converge or is less than a preset value, the training can be stopped. A model obtained through training may be used as an assessment model to assess a probability that a candidate item filled with a parameter is correct. The probability that a candidate item filled with a parameter is correct may be used as a recommendation probability of the candidate item.

The assessment model may also be implemented by using a binary classification model. The binary classification model uses the candidate item (for example, the candidate item filled with a parameter) and the feature of context of the candidate item as an input, and uses a recommendation tag as an output. The binary classification model specifically matches an inputted candidate item and a feature of context of the candidate item with an existing token and a feature of context of the token, to determine a recommendation tag. A value of the recommendation tag may be 0 or 1, or true or false. When the recommendation tag is 0 or false, it indicates that the candidate item is not recommended. When the recommendation tag is 1 or true, it indicates that the candidate item is recommended.

The code processing system 100 may further filter the candidate items based on the recommendation tag, to improve accuracy of predicting the candidate item, thereby improving code completion precision. The assessment model may further obtain statistical information of a candidate item whose recommendation tag is 1, and determine a recommendation probability of the candidate item based on the statistical information, for example, determine the recommendation probability based on a score value.

In some possible implementations, a class method may be called in different environments. Correspondingly, a context of a class method may be different. Based on this, the code processing system 100 may determine, for each method call, a role of the method call based on a feature of context of the method call. For example, for the getitem( ) method, it can be determined that a role of the method call includes a get accessor (or referred to as read accessor); for the add( ) method, it can be determined that a role of the method call includes an adder; and for the removeitem( ) method, it can be determined that a role of the method call includes a remover.

When training the assessment model, the code processing system 100 may further add a feature such as a role of a method call to improve precision of the assessment model. In this way, the assessment model can determine the recommendation probability of the candidate item based on the role of the method call, so that the candidate item recommended by the assessment model better satisfies the intention of the user, and therefore higher completion precision can be obtained.

Considering that a relationship, for example, a producer-consumer relationship, exists between variables in code, a circular reference between the variables is invalid in most scenarios. For example, a variable A is a consumer of a variable B, and the variable B is also a consumer of the variable A, which is usually invalid. Therefore, the code processing system 100 may further track a data flow, so that a circular reference can be avoided, and completion accuracy can be improved.

S408. The code processing system 100 presents the at least one candidate item to the user through the user interface.

Specifically, the code processing system 100 may present, to the user through the user interface such as a GUI, the at least one candidate item determined by the code processing system 100 from the context database based on the feature of context of the to-be-completed code. In some possible implementations, the code processing system 100 further filter the at least one candidate item based on the statistical information. In this case, the code processing system 100 may present, to the user through the user interface such as a GUI, a candidate item obtained through filtering by the code processing system 100 based on the statistical information. The code processing system 100 may further sort the candidate items based on the statistical information, and then display the candidate items in order. For example, the code processing system 100 determines score values of the candidate items based on the statistical information, and displays the candidate items in order of the score values.

In some possible implementations, the candidate item includes a function name, and the code processing system 100 further fills the candidate item with a parameter based on local code. In this case, the code processing system 100 may present, to the user through the user interface such as a GUI, at least one candidate item filled with the parameter by the code processing system 100.

In some possible implementations, the code processing system 100 further inputs the candidate item into the assessment model for assessment, to obtain a recommendation probability of the candidate item, and determines a target candidate item in the at least one candidate item based on the recommendation probability of the at least one candidate item. In this case, the code processing system 100 may present the target candidate item to the user through the user interface such as a GUI. The code processing system 100 may display the target candidate items in order of the recommendation probability.

The to-be-completed code is code in a class method. The code processing system 100 further determines a recommendation probability of the candidate item based on a role called by a method corresponding to the to-be-completed code, and further determines the target candidate item. The code processing system 100 may further display the target candidate item determined based on the role called by the method.

Figure 7:
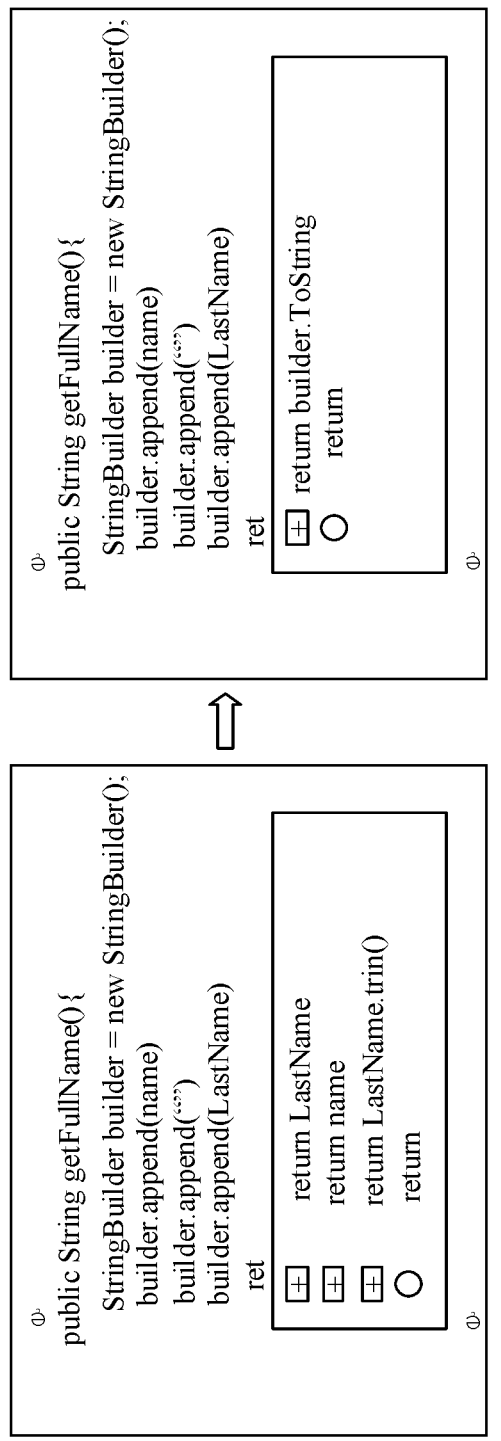
FIG. 7 is a schematic diagram of an effect of code completion according to an embodiment of this application.

The following provides description with reference to a specific example. FIG. 7 is a schematic diagram of an effect of code completion. As shown in FIG. 7, a user completes the method getFullName( ). Specifically, after the user inputs "ret", the code processing system 100 may determine a feature of context of "ret". For example, a return type is string, and both name and LastName are of the string type.

When an assessment model used by the code processing system 100 performs assessment without a role called by the method, as shown in FIG. 7(A), the code processing system 100 may determine, based on a distance between a variable and the to-be-completed code, that a probability of returning LastName is higher than a probability of returning name, and the code processing system 100 first recommends returning LastName and then recommends returning name.

When the assessment model used by the code processing system 100 performs assessment with the role called by the method, as shown in FIG. 7(B), the code processing system 100 may determine that the role called by the method includes a get accessor. The assessment model of the code processing system 100 may sequentially determine, in order from near to far, whether LastName, name, and builder have a function corresponding to the get accessor. Apparently, LastName and name do not have the corresponding function, but builder has the corresponding function. Therefore, the code processing system 100 first returns builder. Considering that the return type is string, toString is called through builder to return the string type. In this case, the code processing system first recommends returning builder.toString.

Although a recommendation result, such as return LastName, shown in FIG. 7(A) is syntactically correct and can be compiled, there is still a gap between the recommendation result and an intention of the user. However, a recommendation result shown in FIG. 7(B) is closer to the real intention of the user, thereby further improving accuracy. In addition, prediction of an unknown pattern can be implemented by using the corresponding method in FIG. 7(B), and has good generalization performance.

In some possible implementations, the code processing system 100 further filters a candidate item with a circular reference out of the at least one candidate item, and the code processing system 100 may present, to the user through the user interface such as a GUI, a candidate item obtained by filtering out the candidate item with the circular reference.

Figure 8:
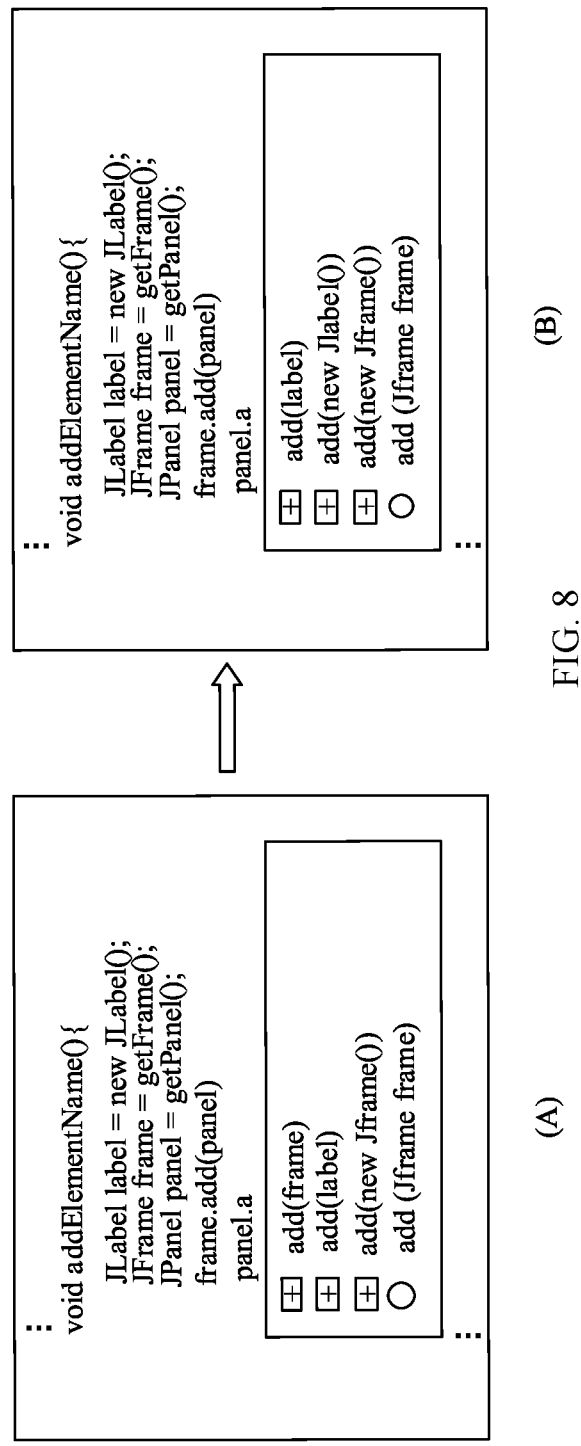
FIG. 8 is a schematic diagram of an effect of code completion according to an embodiment of this application.

The following provides description with reference to a specific example. FIG. 8 is a schematic diagram of an effect of code completion. First, a frame is created, a panel is created, and then the panel is added to the frame by the add method. Then, a user inputs panel.a to trigger code completion with a prefix. If data flow tracking is not performed, as shown in FIG. 8(A), the code processing system 100 first returns add(frame) based on a distance, and a circular reference is formed between the frame and the panel. If data flow tracking is performed, as shown in FIG. 8(B), the code processing system 100 may filter out the candidate item add(frame) with a circular reference and return add(label) first. It can be learned that, by tracking the data flow, accuracy of code completion can be higher, and user experience of code completion can be improved.

Further, after presenting the candidate item (for example, the candidate item filled with a parameter) to the user, the code processing system 100 may further receive a candidate item selected by the user, and update the context database based on the candidate item and the feature of context. In some embodiments, the code processing system 100 may further update, based on the candidate item selected by the user and the feature of context of the candidate item, a dataset for training a model or testing a model.

It should be noted that the foregoing embodiments are mainly described in detail by using class method completion as an example. When a method including a class name, a variable name, and a non-return type is completed, the feature of context of the to-be-completed code may be directly inputted into a pre-trained completion model to obtain a candidate item. The completion model may be specifically a completion model based on statistical information.

The code processing method provided in embodiments of this application is described above in detail with reference to FIG. 1 to FIG. 8. The following describes, with reference to the accompanying drawings, a code processing system, a code processing apparatus, and a computing device configured to implement a code processing function that are provided in embodiments of this application.

Refer to FIG. 1. An embodiment of this application provides a code processing system 100. The system is configured to perform steps S402 to S408 in the foregoing method embodiments, and the system optionally performs optional methods in the foregoing steps. The system includes an IDE 102 and a completion subsystem 104. For compositions of the IDE 102 and the completion subsystem 104 and functions of the components, refer to description of the foregoing related content. Details are not described herein again.

Figure 9:
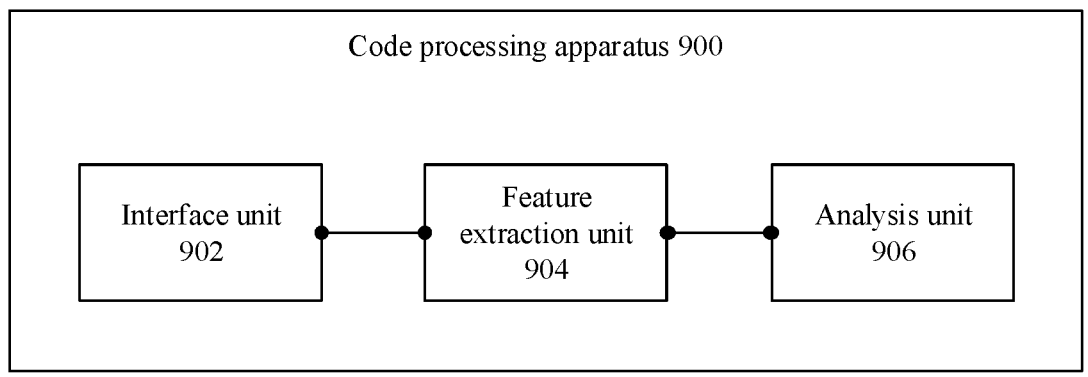
FIG. 9 is a schematic diagram of a structure of a code processing apparatus according to an embodiment of this application.

As shown in FIG. 9, an embodiment of this application further provides a code processing apparatus 900. The apparatus 900 is configured to perform the foregoing code processing method. The code processing apparatus 900 may include the IDE plug-in 1024 and some or all modules in the completion subsystem 104 that are in the system architecture described in FIG. 1. Function division of the code processing apparatus 900 may be the same as the division in FIG. 1. For example, the code processing apparatus 900 includes an IDE plug-in 1024 and a completion subsystem 104. The completion subsystem 104 further includes a code analysis module 1042 and a context database 1044. Optionally, the completion subsystem 104 may further include a parameter filling module 1046, an assessment module 1048, and an index module 1049. The code processing apparatus 900 may further have another division manner for functional units. Division of the functional units in the apparatus 900 is not limited in embodiments of this application. The following provides an example of division.

The code processing apparatus 900 includes an interface unit 902, a feature extraction unit 904, and an analysis unit 906.

The interface unit 902 is configured to receive, through a user interface, code inputted by a user.

The feature extraction unit 904 is configured to determine a feature of context of to-be-completed code based on the code inputted by the user.

The analysis unit 906 is configured to determine at least one candidate item of the to-be-completed code from a context database based on the feature of context of the to-be-completed code, where the context database stores sample code and a feature of context of the sample code.

The interface unit 902 is further configured to present the at least one candidate item to the user through the user interface.

In some possible implementations, the analysis unit 906 is further configured to: obtain statistical information of the at least one candidate item in the context database; and filter the at least one candidate item based on the statistical information.

The interface unit is specifically configured to: present a candidate item obtained through filtering to the user through the user interface.

In some possible implementations, the apparatus 900 further includes: an assessment unit, configured to input the at least one candidate item and the feature of context of the to-be-completed code into an assessment model, to obtain a recommendation probability of the at least one candidate item; and determine a target candidate item in the at least one candidate item based on the recommendation probability of the at least one candidate item.

The interface unit 902 is specifically configured to: present the target candidate item to the user through the user interface.

In some possible implementations, the apparatus 900 further includes: a parameter filling unit, configured to fill, when the candidate item obtained through filtering includes a function name, the at least one candidate item with a parameter based on code in a code file in which the code inputted by the user is located.

The interface unit is specifically configured to: present, to the user through the user interface, the at least one candidate item filled with the parameter.

In some possible implementations, the analysis unit 906 is specifically configured to: search the context database based on the feature of context of the to-be-completed code by using a depth-first search algorithm, and determine the at least one candidate item of the to-be-completed code.

In some possible implementations, the code inputted by the user includes a prefix of the to-be-completed code.

The analysis unit 906 is specifically configured to: determine, from the context database based on the feature of context of the to-be-completed code, at least one candidate item that matches the prefix of the to-be-completed code.

In some possible implementations, the context database includes at least one of a database constructed based on an open source dataset and a database constructed based on a private dataset of the user.

In some possible implementations, the to-be-completed code includes code in a class method, and the code inputted by the user includes a return type.

In some possible implementations, the apparatus 900 further includes: an assessment unit, configured to determine, based on the feature of context of the to-be-completed code, a role called by the class method corresponding to the to-be-completed code, where the role is for assisting in determining the recommendation probability of the candidate item of the to-be-completed code.

In some possible implementations, the analysis unit 906 is further configured to: filter a candidate item with a circular reference out of the at least one candidate item.

The interface unit 902 is specifically configured to: present a candidate item obtained through filtering to the user through the user interface.

The code processing apparatus 900 according to this embodiment of this application may correspondingly perform the method described in embodiments of this application. In addition, the foregoing and other operations and/or functions of the modules/units of the code processing apparatus 900 are separately used to implement corresponding procedures of the methods in the embodiments shown in FIG. 4. For brevity, details are not described herein again.

Figure 10:
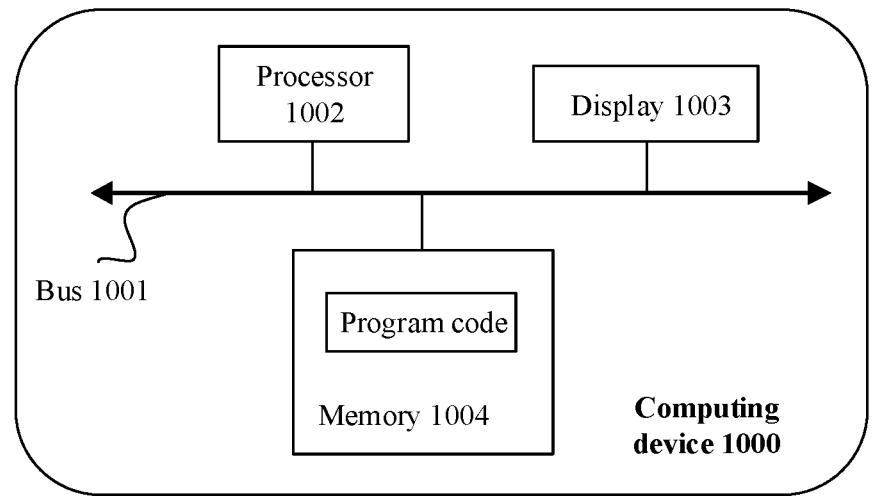
FIG. 10 is a schematic diagram of a structure of a computing device according to an embodiment of this application.

The code processing apparatus 900 may be implemented by using a computing device. FIG. 10 provides a computing device. As shown in FIG. 10, the computing device 1000 may be specifically configured to implement functions of the code processing apparatus 900 in the embodiment shown in FIG. 9.

The computing device 1000 includes a bus 1001, a processor 1002, a display 1003, and a memory 1004. The processor 1002, the memory 1004, and the display 1003 communicate with each other through the bus 1001.

The bus 1001 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is for representing the bus in FIG. 10, but this does not mean that there is only one bus or only one type of bus.

The processor 1002 may be any one or more of processors such as a CPU, a GPU, a microprocessor (MP), or a digital signal processor (DSP).

The display 1003 is an input/output (I/O) device. The device can display electronic files such as code files on a screen for users to view. Based on different manufacturing materials, the display 1003 may be classified into a liquid-crystal display (LCD), an organic light-emitting diode (OLED) display, and the like. Specifically, the display 1003 may display, through a GUI, code inputted by a user, and present a candidate item of to-be-completed code to the user through the GUI.

The memory 1004 may include a volatile memory, for example, a random-access memory (RAM). The memory 1004 may further include a non-volatile memory, for example, a read-only memory (ROM), a flash memory, a hard disk drive (HDD), or a solid-state drive (SSD).

The memory 1004 stores executable program code. The processor 1002 executes the executable program code to perform the foregoing code processing method. Specifically, the processor 1002 executes the program code, to control the display 1003 to receive, through a user interface such as a GUI, code inputted by a user, and then control the display 1003 to transmit, through the bus 1001, the code inputted by the user to the processor 1002. The processor 1002 may determine a feature of context of to-be-completed code based on the code inputted by the user, determine at least one candidate item of the to-be-completed code from a context database based on the feature of context of the to-be-completed code, and then control the display 1003 to present the at least one candidate item to the user through the user interface such as the GUI.

In some possible implementations, the processor 1002 may alternatively control another interface to receive the code inputted by the user. The another interface may be a microphone or the like. Specifically, the microphone may receive the code inputted in a voice form.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD), a semiconductor medium (for example, an SSD), or the like. The computer-readable storage medium includes instructions, and the instructions instruct a computing device to perform the foregoing code processing method applied to the code processing apparatus.

An embodiment of this application further provides a computer program product. The computer program product includes one or more computer instructions. When the computer instructions are loaded and executed on a computing device, all or some of the procedures or functions according to embodiments of this application are generated.

The computer instructions may be stored in a computer-readable storage medium or may be transmitted from a computer-readable storage medium to another computer-readable storage medium. For example, the computer instructions may be transmitted from a website, computer, or data center to another website, computer, or data center in a wired (for example, a coaxial cable, an optical fiber, or a digital subscriber line (DSL)) or wireless (for example, infrared, radio, or microwave) manner.

The computer program product may be a software installation package. When any method of the foregoing code processing method needs to be used, the computer program product may be downloaded and executed on the computing device.

Descriptions of procedures or structures corresponding to the foregoing drawings have respective focuses. For a part that is not described in detail in a procedure or structure, refer to related descriptions of other procedures or structures.

What is claimed is:

1. A code processing method, comprising:
   receiving, through a user interface, first code from a user;
   determining a first feature of context of to-be-completed code based on the first code;
   determining at least one candidate item of the to-be-completed code from a context database based on the first feature, wherein the context database stores sample code and a second feature of context of the sample code; and
   filtering a candidate item with a circular reference out of the at least one candidate item to obtain at least one first candidate item; and
   presenting the at least one first candidate item to the user through the user interface.

2. The code processing method of claim 1, further comprising:
   obtaining statistical information of the at least one first candidate item in the context database; and
   filtering the at least one first candidate item based on the statistical information to obtain at least one second candidate item, and
   wherein presenting the at least one first candidate item to the user comprises presenting the at least one second candidate item to the user through the user interface.

3. The code processing method of claim 1, further comprising inputting the at least one first candidate item and the first feature into an assessment model to obtain a recommendation probability of the at least one first candidate item, and wherein presenting the at least one first candidate item to the user comprises:
   determining a target candidate item in the at least one first candidate item based on the recommendation probability; and
   presenting the target candidate item to the user through the user interface.

4. The code processing method of claim 1, wherein the first candidate item comprises a function name, wherein the code processing method further comprises filling the at least one first candidate item with a parameter based on second code in a code file that comprises the first code to generate a filled-in at least one first candidate item that is filled with the parameter, and wherein presenting the at least one first candidate item to the user comprises presenting, to the user through the user interface, the filled-in at least one first candidate item.

5. The code processing method of claim 1, wherein determining the at least one first candidate item comprises:
   searching the context database based on the first feature using a depth-first search algorithm; and
   determining the at least one first candidate item based on the searching.

6. The code processing method of claim 1, wherein the first code comprises a prefix of the to-be-completed code, and wherein determining the at least one first candidate item comprises determining, from the context database based on the first feature, one or more candidate items that match the prefix.

7. The code processing method of claim 1, wherein the context database comprises at least one of a first database based on an open source dataset or a second database based on a private dataset of the user.

8. The code processing method of claim 1, wherein the to-be-completed code comprises second code in a class method, and wherein the first code comprises a return type.

9. The code processing method of claim 8, further comprising determining, based on the first feature, a role called by the class method corresponding to the to-be-completed code, wherein the role is for assisting in determining a recommendation probability of the at least one first candidate item.

10. A device comprising:
a memory configured to store executable instructions; and
a processor coupled to the memory and configured to execute instructions to cause the device to:
receive, through a user interface, first code from a user;
determine a first feature of context of to-be-completed code based on the first code;
determine at least one candidate item of the to-be-completed code from a context database based on the first feature, wherein the context database stores sample code and a second feature of context of the sample code;
filter a candidate item with a circular reference out of the at least one candidate item to obtain at least one first candidate item; and
present the at least one first candidate item to the user through the user interface.

11. The device of claim 10, wherein the processor is further configured to execute the instructions to cause the device to:
obtain statistical information of the at least one first candidate item in the context database;
filter the at least one first candidate item based on the statistical information to obtain at least one second candidate item; and
present at least one second candidate item to the user through the user interface.

12. The device of claim 10, wherein the processor is further configured to execute the instructions to cause the device to:
input the at least one first candidate item and the first feature into an assessment model to obtain a recommendation probability of the at least one first candidate item;
determine a target candidate item in the at least one first candidate item based on the recommendation probability; and
present the target candidate item to the user through the user interface.

13. The device of claim 10, wherein the processor is further configured to execute the instructions to cause the device to:
fill, when the first candidate item obtained through filtering comprises a function name, the at least one first candidate item with a parameter based on second code in a code file that comprises the first code to generate a filled-in at least one first candidate item that is filled with the parameter; and
present, to the user through the user interface, the filled-in at least one first candidate item.

14. The device of claim 10, wherein the processor is further configured to execute the instructions to cause the device to:
search the context database based on the first feature o using a depth-first search algorithm; and
determine the at least one first candidate item based on the search.

15. The device of claim 10, wherein the first code comprises a prefix of the to-be-completed code, and wherein the processor is further configured to execute the instructions to cause the device to determine, from the context database based on the first feature, one or more candidate items that match the prefix of the to-be-completed code.

16. The device of claim 10, wherein the context database comprises at least one of a first database based on an open source dataset or a second database based on a private dataset of the user.

17. The device of claim 10, wherein the to-be-completed code comprises second code in a class method, and wherein the first code comprises a return type.

18. The device of claim 17, wherein the processor is further configured to execute the instructions to cause the device to determine, based on the first feature, a role called by the class method corresponding to the to-be-completed code, wherein the role is for assisting in determining a recommendation probability of the at least one first candidate item.

* * * * *